J. E. W. REEH

July 7, 1931. Re. 18,124

APPARATUS FOR AND PROCESS OF CONGELATION

Original Filed Nov. 6, 1928 2 Sheets-Sheet 1

INVENTOR.

JOHANNES EMMERICK WOLFF REEH

By William C. Linton
Attorney.

J. E. W. REEH

July 7, 1931. Re. 18,124

APPARATUS FOR AND PROCESS OF CONGELATION

Original Filed Nov. 6, 1928 2 Sheets-Sheet 2

INVENTOR.

JOHANNES EMMERICK WOLFF REEH

By William C. Linton

Attorney.

Reissued July 7, 1931 Re. 18,124

UNITED STATES PATENT OFFICE

JOHANNES EMMERICK WOLFF REEH, OF LA ROCHELLE, FRANCE, ASSIGNOR TO SOCIETE ANONYME DE CONSERVATION INDUSTRIELLE DU POISSON, OF PARIS, FRANCE

APPARATUS FOR AND PROCESS OF CONGELATION

Original No. 1,747,080, dated February 11, 1930, Serial No. 317,673, filed November 6, 1928, and in France November 8, 1927. Application for reissue filed October 4, 1930. Serial No. 486,450.

The present invention relates to an apparatus for the rapid congelation of various articles, and chiefly alimentary articles such as meat, fish or the like, for the better preservation of the said articles.

The apparatus according to the invention consists essentially of a drum which is divided by longitudinal and radial partitions into chambers adapted to contain the articles or substances to be frozen. The said drum is rotatable on its axle and is provided at the central part with conduits supplying the freezing liquid and characterized by the particular feature consisting in the fact that they will deliver a shower of liquid upon the substances in said chambers only when the chambers are situated below the horizontal plane passing through the axis of the drum. After acting upon the said substances to be frozen, the liquid flows out through perforations in the external casing of the drum into a tank in which its temperature is again lowered, and it returns thence into the apparatus.

The said apparatus according to the invention will serve for the continuous congelation of large quantities of articles, and chiefly fish which are thus treated as fast as caught. The importance of this lies in the fact that it is distinctly advantageous to freeze the fish whole and in their natural state as taken from the water. Living fish in their natural occurrence are covered by a protecting slime. If that slime is fixed on the fish and the fish frozen therein, it remains a protecting envelope, but that advantage cannot be gained unless the fish are treated as fast as caught, because, left for a time after capture, the slime becomes a virulent breeding ground for harmful bacteria. As will be observed, the apparatus of the present invention is adapted for installation and operation aboard a trawler, so that immediate treatment of fish upon capture is possible.

The following description, with reference to the appended diagrammatic drawings which are given by way of example, shows a constructional form of the said apparatus and the method by which the process may be carried into effect.

Figure 1:
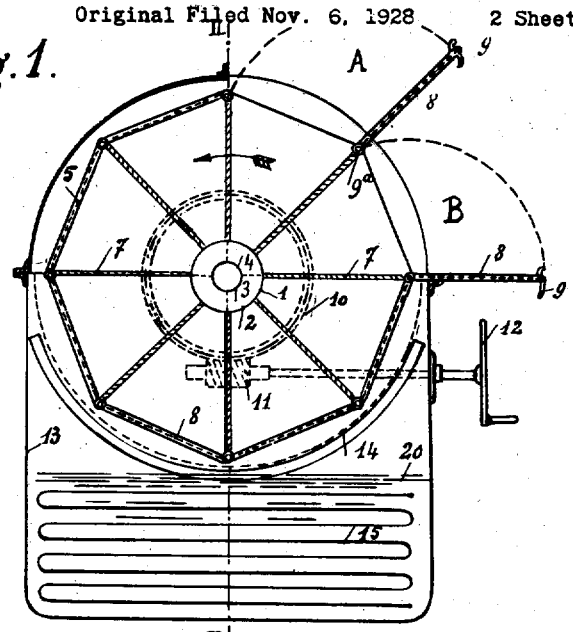
Fig. 1 is a cross section of the apparatus on the line I—I of Fig. 2.
Figure 2:
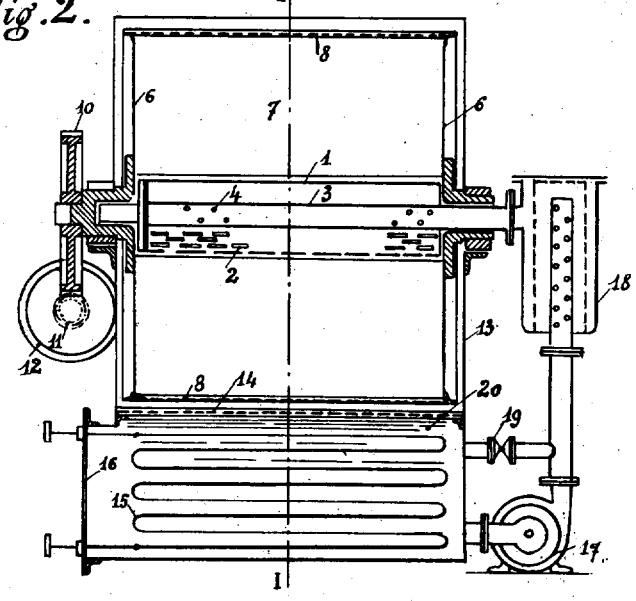
Fig. 2 is a lengthwise section on the line II—II of Fig. 1.

Referring to Figs. 1 and 2, the apparatus essentially comprises a stationary cylinder 1 having the perforations 2 on its lower half. The axle 3 of the said cylinder is hollow and is pierced with the perforations 4. A drum 5 is mounted concentric with the cylinder 1 and is rotatable about the latter. The said drum is closed at the ends by the plates 6—6 and comprises in the interior a set of radial partitions 7 which come almost in contact with the stationary distributing cylinder 1. The said partitions form a set of chambers or receptacles which can be opened at the periphery of the drum by means of the perforated doors 8 each of which can be fastened in closed position by a latch 9.

The worm wheel 10 keyed to the drum 5 serves to rotate the latter by means of the worm 11 driven by a hand wheel 12.

The whole apparatus thus composed is placed within the tank 13 in which is disposed a perforated element or strainer 14 cooperating with the drum 5.

In the tank 13 is disposed the evaporating coiled pipe 15 of a refrigerating machine, said tank preferably having a removable side 16 for facilitating the insertion of the coil pipe 15. A circulation pump 17 is arranged for drawing the liquid from the bottom of the tank 13 and for delivering it, through the filter 18, into the hollow axle 3 of the stationary cylinder 1. The pipe 19 provided with an adjustable valve is adapted to make a direct connection between the tank and the delivery end of the pump; for all necessary regulation.

Figure 3:
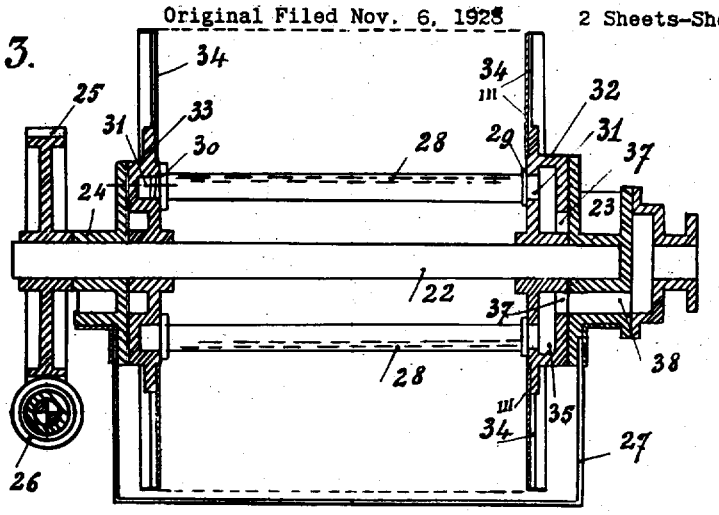
Fig. 3 is a lengthwise section analogous to Fig. 2, showing a modification.
Figure 4:
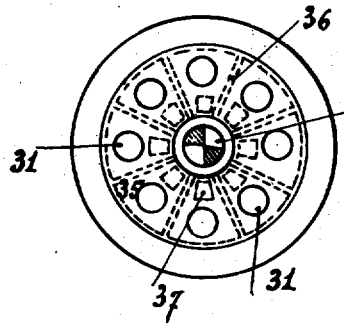
Fig. 4 is a view of the distributing arrangement in section on the line III—III of Fig. 3.

In the modification shown in Figs. 3 and 4, the drum which is divided into chambers is keyed to a shaft 22 which is mounted in two bearings 23—24 and is rotated, as hereinbefore described, by a worm wheel 25 and a worm 26; said drum rotates within a tank 27 to which the said bearings are secured.

Each chamber contains one or more perforated tubes 28 and each tube carries at one end a flange 29 provided with packing, and the other end is threaded and carries a nut 30, so that the said tubes can be removably mounted in relation to the apertures 31 of the cheeks 32—33 which are mounted on the shaft 22 and carry the end plate 34 of the said drum. The cheek 32 is recessed, and the recess is divided into chambers 35 by partitions 36 corresponding to the partitions of the chambers of the drum. Each tube 28 communicates with a corresponding chamber 35 which is provided on the other side with apertures 37, so that during the rotation of the drum the said apertures will register with the ports 38 formed in the lower part of the bearing 23 which is suitably supplied with the cooling liquid.

The operation of the apparatus is as follows:

The substances to be frozen are loaded at A (Fig. 1), and the cover 8 is then closed. The hand wheel is used to rotate the drum 5 in the direction of the arrow by the width of one chamber, and this succeeding chamber is loaded, and so on. When a loaded chamber is situated below the horizontal plane passing through the axis of rotation, the substances therein will be acted upon by the streams of liquid issuing from the apertures 2. As the loaded chambers return to the upper part, they are opened at B to be discharged. The strainer 14 partly surrounding the drum 5 serves to retain the said substances or other objects which might fall into the tank 13 due to improper handling. The liquid in the tank should entirely cover the coiled tube.

Figure 5:
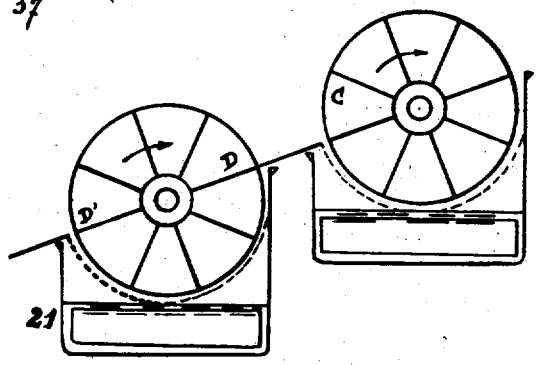
Fig. 5 is a diagrammatic sectional view analogous to Fig. 1, showing two similar apparatus functioning in series.

Fig. 5 shows the apparatus operating in series, and the apparatus are rotatable in the direction of the arrows. The chambers C and D are opened at the same time so that the articles will proceed by gravity from the first into the second. After rotating in the tank, the chamber D will come to D′ and will then be emptied by gravity.

According to the process of the invention, the articles to be frozen are preliminarily coated with a substance whose freezing temperature is above the temperature necessary for the preservation of the frozen articles. I prefer to use a substance which is insoluble in the liquid in which the said articles are treated. For this purpose, oils may be employed as oil of sesame, maize, earthnut or the like, so that the said articles will each be surrounded by a sort of cold and solid coating, and will be thus entirely separated and protected while in the cooling liquid. It should however be noted that while this operation is preferable for certain articles, it may be dispensed with in the case of other articles with which its use would be difficult. It will be seen that the articles to be frozen are so handled that fish are first subjected to the cold atmosphere over the refrigerating liquid, thus preliminarily fixing the slime on the fish so that it will not be washed off when subjected to the circulating liquid refrigerant.

Having so described my said invention, I declare that what I claim is:

1. An apparatus for cooling and freezing fish or the like comprising a rotatably mounted drum divided into a plurality of compartments, means disposed within said drum for delivering refrigerating liquid to certain of the compartments of the drum with rotation of the latter, and means formed on said drum to permit the discharge of the refrigerating liquid from the compartments of the drum.

2. An apparatus for cooling and freezing fish or the like comprising a rotatably mounted drum divided into a plurality of longitudinal compartments, means, disposed axially of said drum for delivering a refrigerating liquid to the compartments of the drum, moving, with rotation of the latter, below the horizontal plane passing through the axis of said drum, and means formed on the drum to permit the discharge of the refrigerating liquid from the compartments of the drum.

3. An apparatus for cooling and freezing fish or the like comprising a rotatably mounted drum divided into a plurality of longitudinal compartments, a fixed conduit disposed axially of said drum and provided with perforations at its lower half portion for delivering a refrigerating liquid to the compartments of the drum, moving, with rotation of the latter, below the horizontal plane passing through the axis of said drum, and means formed on the drum to permit the discharge of the refrigerating liquid from the compartments of the drum.

4. An apparatus for cooling and freezing fish or the like comprising a rotatably mounted drum divided into a plurality of compartments, means disposed within said drum for delivering a refrigerating liquid to certain of the compartments of the drum with rotation of the latter, means formed on said drum to permit the discharge of the refrigerating liquid from the compartments of the drum, a tank adapted to receive the refrigerating liquid discharged from the compartments of said drum, and a pump for forcing the liquid from the tank into the liquid delivering means of the drum.

5. An apparatus for cooling and freezing fish or the like comprising a rotatably mounted drum divided into a plurality of longitudinal compartments, means disposed axially of said drum for delivering a refrigerating liquid to the compartments of the drum, moving, with rotation of the latter below the horizontal plane passing through the axis of said drum, means formed on the drum to permit the discharge of the refrigerating liquid from the compartments of the drum, a tank adapted to receive the refrigerating liquid discharged from the compartments of said drum, refrigerating means arranged in said tank, and a pump for forcing the liquid from the tank into the liquid delivering means of the drum.

6. An apparatus for cooling and freezing fish or the like comprising a rotatably mounted drum divided into a plurality of longitudinal compartments, a fixed conduit disposed axially of said drum and provided with perforations at its lower half portion for delivering a refrigerating liquid to the compartments of the drum, moving, with rotation of the latter, below the horizontal plane passing through the axis of said drum, means formed on the drum to permit the discharge of the refrigerating liquid from the compartments of the drum, a tank adapted to receive the refrigerating liquid from the compartments of the drum, a refrigerating coil arranged within said tank, and a pump for forcing the refrigerating liquid from the tank into the liquid delivering conduit of the drum.

7. An apparatus for cooling and freezing fish or the like comprising a rotatably mounted drum divided into a plurality of compartments, means disposed within said drum for delivering refrigerating liquid to certain of the compartments of the drum with rotation of the latter, and means to permit the discharge of the refrigerating liquid from the compartments of the drum.

8. An apparatus for cooling and freezing fish or the like comprising a rotatably mounted structure having a plurality of compartments, and means for circulating a refrigerating liquid independently through each of said compartments.

9. An apparatus for cooling and freezing fish or the like comprising a rotatably mounted structure having a plurality of compartments, and means for circulating a refrigerating liquid selectively through the compartments below the axis of rotation.

10. An apparatus for cooling and freezing fish or the like comprising a rotatably mounted structure having a plurality of compartments, means for delivering a refrigerating liquid to said structure, and valve mechanism for selectively directing said refrigerating liquid to certain of said compartments during rotation.

11. An apparatus for cooling and freezing fish or the like comprising a rotatably mounted structure having a plurality of compartments, means for delivering a refrigerating liquid to said structure, and valve mechanism operating by the rotation of said structure for selectively directing said refrigerating liquid to certain of said compartments.

12. An apparatus for cooling and freezing fish or the like comprising a rotatably mounted structure divided into a plurality of compartments by imperforate partitions, and means for circulating a refrigerating liquid through said compartments as and when they are in their lower positions.

13. The process of preserving fish and the like which comprises first subjecting them immediately as caught and for a substantial period of time to a preliminary chilling atmosphere and then subjecting them to a liquid refrigerant.

14. The process of preserving fish which comprises first subjecting them for a substantial period of time to a confined atmosphere over a liquid refrigerant and then subjecting them directly to a liquid refrigerant.

15. The process of preserving fish which comprises first subjecting them for a substantial period of time to a confined atmosphere over a liquid refrigerant in motion and then subjecting them directly to a liquid refrigerant.

16. The process of preserving fish which comprises first subjecting them immediately as caught and for a substantial period of time to a confined atmosphere over a liquid refrigerant, and then subjecting them directly to a liquid refrigerant.

17. An apparatus for cooling and freezing fish or the like comprising an enclosing housing with a side opening at a predetermined level, a receptacle for articles to be frozen, and means for moving said receptacle through said housing first over a liquid refrigerant maintained below said level and then through said liquid refrigerant.

18. An apparatus for cooling and freezing fish or the like comprising a rotatably mounted structure having a plurality of compartments, means for containing a body of refrigerating liquid isolated from said structure, and means for spraying said refrigerating liquid through said compartments.

19. An apparatus for cooling and freezing fish or the like comprising a rotatably mounted structure having a plurality of compartments, means for delivering a refrigerating liquid to the center of said structure, and means for directing said refrigerating liquid from the center of said structure to said compartments as and when they are in their lower positions.

20. An apparatus for cooling and freezing fish or the like comprising means for containing a body of liquid refrigerant, a structure rotatably mounted away from said body of liquid refrigerant and having a plurality of compartments, and a liquid refrigerant circuit serially including spraying means, said rotatable structure, said containing means, a pump and a filter.

21. An apparatus for cooling and freezing fish or the like comprising a rotatably mounted structure having a plurality of compartments, means for enclosing said structure, means for feeding a liquid refrigerant to said structure intermediate its top and bottom, and means for introducing articles to be frozen into one of said compartments in top position and simultaneously taking frozen articles from another of said compartments in side position above said feed of liquid refrigerant.

22. An apparatus for cooling and freezing fish or the like comprising an enclosing housing, a receptacle for articles to be frozen, and means for moving said receptacle in said housing first over a liquid refrigerant and then through a liquid refrigerant.

23. An apparatus for cooling and freezing fish or the like comprising an enclosing housing, a plurality of receptacles for articles to be frozen, carrier means whereby said receptacles with fish are moved in said housing through an upper and a lower zone, and means for feeding a liquid refrigerant exclusively to said lower zone.

In witness whereof, I the said JOHANNES EMMERICK WOLFF REEH, have hereunto set my hand at Paris, France, this 18th day of September 1930.

JOHANNES EMMERICK WOLFF REEH.